US012556847B2

(12) United States Patent
Zhang

(10) Patent No.: US 12,556,847 B2
(45) Date of Patent: Feb. 17, 2026

(54) SPEAKER SYSTEM

(71) Applicant: WUXI FUTURE MIRROR DISPLAY TECHNOLOGY CO., LTD., Jiangsu (CN)

(72) Inventor: Jian Zhang, Jiangsu (CN)

(73) Assignee: WUXI FUTURE MIRROR DISPLAY TECHNOLOGY CO., LTD., Jiangsu (CN)

( * ) Notice: Subject to any disclaimer, the term of this patent is extended or adjusted under 35 U.S.C. 154(b) by 156 days.

(21) Appl. No.: 18/649,567

(22) Filed: Apr. 29, 2024

(65) Prior Publication Data

US 2025/0063279 A1 Feb. 20, 2025

(30) Foreign Application Priority Data

Aug. 18, 2023 (CN) ......................... 202311051182.0

(51) Int. Cl.
*H04R 1/02* (2006.01)

(52) U.S. Cl.
CPC .................................... *H04R 1/025* (2013.01)

(58) Field of Classification Search
CPC .... H04R 1/02; H04R 2201/025; H04R 1/026; H04R 1/025
USPC .......................................................... 381/395
See application file for complete search history.

(56) References Cited

U.S. PATENT DOCUMENTS

| | | | | | |
|---|---|---|---|---|---|
| 7,455,271 | B2 * | 11/2008 | Pincek | F16M 13/02 | 248/220.21 |
| 2014/0079266 | A1 * | 3/2014 | Szymanski | H04R 1/026 | 381/334 |
| 2015/0201259 | A1 * | 7/2015 | May | F16M 11/2021 | 248/397 |
| 2016/0091134 | A1 * | 3/2016 | May | G10D 13/02 | 248/404 |

FOREIGN PATENT DOCUMENTS

CN 217546232 U * 10/2022

* cited by examiner

*Primary Examiner* — Sean H Nguyen

(74) *Attorney, Agent, or Firm* — Apex Attorneys at Law, LLP; Yue (Robert) Xu

(57) ABSTRACT

A speaker system includes a speaker module, a mounting housing and a mounting rod set. The speaker module has a first mounting state and a second mounting state, and the mounting housing is provided with a mounting cavity. The speaker module is mounted in the mounting cavity in the first mounting state, and is mounted and supported at a top portion of the mounting rod set in the second mounting state. With the speaker system in the present application, a user, when using the speaker module, can combine and mount the speaker module with one of the mounting housing and the mounting rod set to flexibly select the mounting manner according to demands in actual situations, such that different using demands of the user are satisfied, which improves user experience.

18 Claims, 7 Drawing Sheets

SPEAKER SYSTEM

CROSS REFERENCE TO RELATED APPLICATIONS

This application claims the priorities to Chinese patent application No. 202311051182.0, titled "SPEAKER SYSTEM", filed with the China National Intellectual Property Administration on Aug. 18, 2023, the entire disclosure of which is hereby incorporated by reference.

FIELD

The present application relates to the technical field of electronic devices, and in particular to a speaker system.

BACKGROUND

A speaker converts an electrical audio signal into a corresponding sound, which further propagates into space. The speaker is an important part of a speaker system. In the related art, the speaker is of an independent box structure and can only be mounted in a relatively simple situation in actual use, which cannot satisfy different using demands of users. Therefore, there is room for improvement.

SUMMARY

An object of the present application is to solve at least one of the technical problems in the prior art. To achieve this object, a speaker system is provided according to the present application, and the speaker system is applicable to different types of mounting situations, so as to satisfy different mounting demands of users.

The speaker system according to the present application includes a speaker module, a mounting housing and a mounting rod set,

- the speaker module has a first mounting state and a second mounting state, and the mounting housing is provided with a mounting cavity; and
- the speaker module is mounted in the mounting cavity in the first mounting state, and the speaker module is mounted and supported at a top portion of the mounting rod set in the second mounting state.

According to embodiments of the present application, a user, when using the speaker module, can combine and mount the speaker module with one of the mounting housing and the mounting rod set to flexibly select the mounting manner according to demands in actual situations, such that different using demands of the user are satisfied, which improves user experience.

According to some embodiments of the present application, the mounting housing and the mounting rod set are both independent with respect to and detachable from the speaker module.

According to some embodiments of the present application, the mounting cavity is open at a side of the mounting housing, and the side of the mounting housing is connected with a cover plate, and the cover plate is configured for opening or closing the mounting cavity, and in a case that the mounting cavity is closed by the cover plate, the speaker module is fixed in the mounting cavity by the cover plate.

According to some embodiments of the present application, one side edge of the cover plate is rotatably connected to the mounting housing, and another side edge of the cover plate can be locked or unlocked with respect to the mounting housing.

According to some embodiments of the present application, the another side edge of the cover plate is provided with a first snap-fit portion, and the mounting housing is provided with a second snap-fit portion, and the first snap-fit portion and the second snap-fit portion are connected by snap-fit.

According to some embodiments of the present application, the another side edge of the cover plate is provided with a first positioning portion, and the mounting housing is provided with a second positioning portion, and the first positioning portion and the second positioning portion are connected by insertion for positioning.

According to some embodiments of the present application, the speaker module is provided with a speaker hole, the cover plate is provided with an avoidance hole, and the speaker hole is exposed at a position of the avoidance hole in the case that the mounting cavity is closed by the cover plate.

According to some embodiments of the present application, the speaker module is disc-shaped, an outer diameter of the speaker module is larger than an inner diameter of the avoidance hole, and an axis of the speaker module coincides with an axis of the avoidance hole.

According to some embodiments of the present application, the speaker module is positioned and fitted with the mounting housing in the mounting cavity, and the speaker module is detachably connected to the mounting housing through a connector.

According to some embodiments of the present application, the speaker module is provided with a first connecting portion, the mounting housing is provided with a mounting hole, and the connector passes through the mounting hole and extends into the mounting cavity to be connected to the first connecting portion.

According to some embodiments of the present application, the connector includes a threaded segment, a smooth segment and a head portion being connected in sequence, and the smooth segment passes through the mounting hole, the threaded segment is in threaded fit with the first connecting portion, and the head portion abuts against a side edge of the mounting hole away from the mounting cavity.

According to some embodiments of the present application, a side of the mounting housing away from the speaker module is provided with a support member, and in a case that the speaker module is in the first mounting state, the support member is supported on a placement surface.

According to some embodiments of the present application, the mounting housing is provided with a support plane, the support plane together with the support member is supported on the placement surface, and an angle between the mounting housing and the support member ranges from 25° to 30°.

According to some embodiments of the present application, a bottom portion of the support member is provided with a first anti-slip mat, and/or, the support plane is provided with a second anti-slip mat.

According to some embodiments of the present application, the mounting housing is provided with a limiting portion, and in a case that the support member is rotated with respect to the mounting housing to a maximum angle, the support member abuts against the limiting portion and is limited by the limiting portion.

According to some embodiments of the present application, the speaker module is provided with multiple connecting positions, the mounting rod set includes multiple support rods, and top portions of the multiple support rods are connected to the multiple connecting positions in one-to-one correspondence.

According to some embodiments of the present application, the multiple connecting positions are multiple connection holes, a top portion of each support rod is provided with a threaded connecting segment, and the threaded connecting segment extends into the corresponding connection hole to be in a threaded connection with the speaker module.

According to some embodiments of the present application, the speaker module is disc-shaped, and the speaker module includes a first side surface, a second side surface and an annular surface, and the first side surface and the second side surface are opposite to each other, the annular surface is arranged around the first side surface and the second side surface, the first side surface is provided with a speaker hole, and the second side surface and/or the annular surface are provided with the connecting positions.

Additional aspects and advantages of the application will be partly given in description hereinafter, and part of them will become apparent in the description or be known in practice of the application.

BRIEF DESCRIPTION OF THE DRAWINGS

The above and/or additional aspects and advantages of the present application become apparent and easy to be understood in the following description of embodiments in conjunction with the following drawings.

Figure 1:
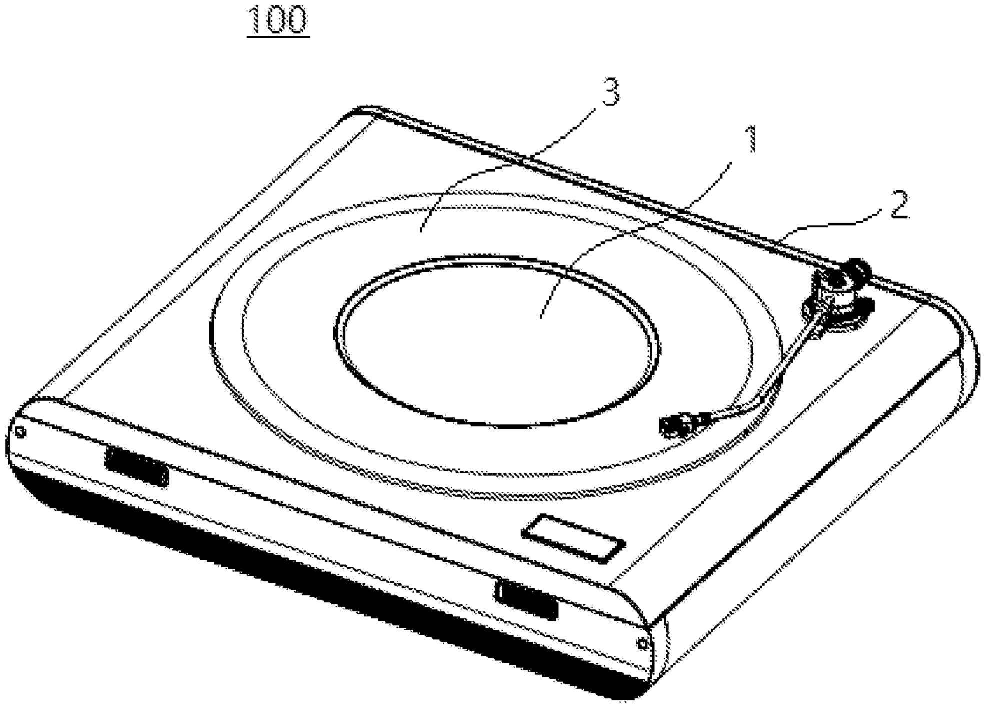
FIG. 1 is an assembly view showing a speaker module being mounted to a mounting housing according to embodiments of the present application.

Reference numerals:

| | | | |
|---|---|---|---|
| 100 | speaker system, | 1 | speaker module, |
| 11 | connection hole, | 12 | first side surface, |
| 13 | second side surface, | 14 | annular surface, |
| 15 | first connecting portion, | 16 | positioning protrusion, |
| 17 | connecting rod, | 18 | avoidance groove, |
| 2 | mounting housing, | 21 | hole, |
| 22 | positioning hole, | 23 | mounting cavity, |
| 231 | reinforcing boss, | 24 | limiting portion, |
| 25 | mounting hole, | 26 | support plane, |
| 27 | second anti-slip mat, | 3 | cover plate, |
| 31 | hook, | 32 | positioning rod, |
| 33 | avoidance hole, | 4 | connector, |
| 41 | threaded segment, | 42 | smooth segment, |
| 43 | head portion, | 5 | cover cap, |
| 6 | support member, | 61 | bottom rod, |
| 62 | first anti-slip mat, | 63 | lateral rod, |
| 7 | mounting rod set, | 71 | support rod. |

DETAILED DESCRIPTION OF THE EMBODIMENTS

Embodiments of the present application are described in detail hereinafter, and examples of the embodiments are illustrated in the drawings. The same or similar elements and the elements having same or similar functions are denoted by same or similar reference numerals. The embodiments described hereinafter with reference to drawings are only exemplary, and are only used to explain the present application, therefore should not be construed as a limitation to the scope of the present application.

In the description of the present application, it should be noted that the orientation or positional relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counter-clockwise", "axial", "radial", "circumferential", and the like are based on the orientation or positional relationships shown in the drawings, and are merely for the convenience of describing the present application and the simplification of the description, and do not indicate or imply that the device or element referred to must have a particular orientation, or be configured and operated in a particular orientation, which therefore should not be construed as a limitation to the scope of the present application. Moreover, the feature defined by the terms "first", "second" may explicitly or implicitly include one or more such features. In the description in the present application, unless otherwise described, the term "multiple" indicates two or more than two.

In the description of the present application, it should be noted that, unless otherwise specified and defined, the terms "mounting", "connect with" and "connection" should be understood broadly. For example, the "connection" may be a fixed connection, a detachable connection, or an integral connection, or may be a mechanical connection or an electrical connection, or may be a direct connection, an indirect connection through a medium, or communication of interiors of two elements. The specific meanings of the above terms in the present application can be understood by those skilled in the art according to specific situations.

A speaker system 100 according to embodiments of the present application is described with reference to FIG. 1 to FIG. 7. A speaker module 1 of the speaker system 100 has two different mounting manners, and can be flexibly and selectively mounted according to actual mounting situations or different mounting demands of users, thereby satisfying different mounting needs, enlarging the application range of the speaker system 100 and improving user experience.

As shown in FIG. 1 to FIG. 7, the speaker system 100 according to an embodiment of the present application includes a speaker module 1, a mounting housing 2 and a mounting rod set 7.

The speaker module 1 is for playing audio. A display screen may be added to the speaker module 1 to display video corresponding to the audio. The speaker module 1 is provided with a speaker hole, through which the audio is played. The mounting housing 2 is provided with a mounting cavity 23 for mounting the speaker module 1. The mounting cavity 23 is of a cavity structure, and one side of the mounting cavity 23 is open. Moreover, the mounting rod set 7 can be connected and fixed to the speaker module 1 to support and fix the speaker module 1.

That is to say, the speaker module 1 has two mounting states, namely a first mounting state and a second mounting state. In the first mounting state, the speaker module 1 is mounted in the mounting cavity 23, such that the mounting housing 2 completely or partially encloses the speaker module 1. Alternatively, in the second mounting state, the speaker module 1 is mounted and supported at a top portion of the mounting rod set 7, such that the speaker module 1 is mounted at a relatively high spatial position with respect to a placement surface.

By selectively combining and mounting the speaker module 1 with the mounting housing 2 or the mounting rod set 7, the speaker module 1 has two mounting states, which facilitates selectively mounting by the user.

Specifically, in a case that the user needs to place the speaker module 1 in a space where the speaker module 1 can be easily touched, or in a space with a lot of dusts, or in other spaces where the speaker module 1 needs to be at least partially enclosed, the speaker module 1 may be mounted in the mounting housing 2, such that the mounting housing 2 can at least partially protect the speaker module 1, so as to prevent the speaker module 1 from external impacts or being covered by dusts, and improve safety of the speaker module 1. Alternatively, in a case that the user needs to place the speaker module 1 at a relatively high position while the speaker module 1 cannot meet the need by its own height, the mounting rod set 7 may be mounted to a bottom portion of the speaker module 1 for supporting the speaker module 1, such that the speaker module 1 is at a relatively high spatial position, and the audio can be spread to a wider range.

With the speaker system 100 according to embodiments of the present application, the user, when using the speaker module 1, can combine and mount the speaker module 1 with one of the mounting housing 2 and the mounting rod set 7, so as to flexibly select the mounting manner according to demands in actual situations, thus different using demands of the user are satisfied, which improves user experience.

In some embodiments, the mounting housing 2 and the mounting rod set 7 are both independent with respect to and detachable from the speaker module 1. That is to say, the speaker module 1 can be detached from the mounting housing 2 after being mounted to the mounting housing 2. Similarly, the speaker module 1 can be detached from the mounting rod set 7 independently after being mounted to the mounting rod set 7. In this way, mounting of the speaker module 1 with respect to the mounting housing 2 does not interfere with mounting of the speaker module 1 with respect to the mounting rod set 7, therefore mounting manners are flexible.

Certainly, during actual mounting, when one of the mounting housing 2 and the mounting rod set 7 is damaged, the speaker module 1 can be directly detached, such that the mounting housing 2 or the mounting rod set 7 can be replaced independently, which reduces mounting cost. Furthermore, when mounting the speaker module 1 to the mounting housing 2, the mounting rod set 7 is detached from the speaker module 1, such that an overall size of the speaker module 1 and the mounting housing 2 after mounting is relatively small, and a mounting space being occupied is relatively small. Similarly, after the speaker module 1 is connected to the mounting rod set 7, the entire structure is also relatively small, and the space being occupied is reduced, which facilitates mounting.

In some embodiments, the mounting cavity 23 is open at a side of the mounting housing 2, and the side of the mounting housing 2 is connected with a cover plate 3. The cover plate 3 can open or close the mounting cavity 23, and when the mounting cavity 23 is closed by the cover plate 3, the speaker module 1 is fixed in the mounting cavity 23 by the cover plate 3. In this way, when the speaker module 1 is mounted and fixed to the mounting housing 2, the cover plate 3 is detached with respect to the mounting cavity 23, the speaker module 1 is mounted in the mounting cavity 23, and then the mounting cavity 23 is closed by the cover plate 3, such that the cover plate 3 abuts against the speaker module 1 and fixes the speaker module 1 in the mounting cavity 23.

Therefore, as a part of the mounting housing 2, the cover plate 3 can not only cover and protect the speaker module 1, but also fix the speaker module 1, such that the speaker module 1 is stably mounted in the mounting cavity 23. In actual design, the mounting housing 2 can be opened and closed by the cover plate 3 manually, which is easy and flexible in using.

In some embodiments, one side edge of the cover plate 3 is rotatably connected to the mounting housing 2, and another side edge of the cover plate 3 can be locked or unlocked with respect to the mounting housing 2. In other words, the cover plate 3 is rotatable with respect to the mounting housing 2, such that the cover plate 3 rotates to different positions to open or close the mounting cavity 23.

Figure 4:
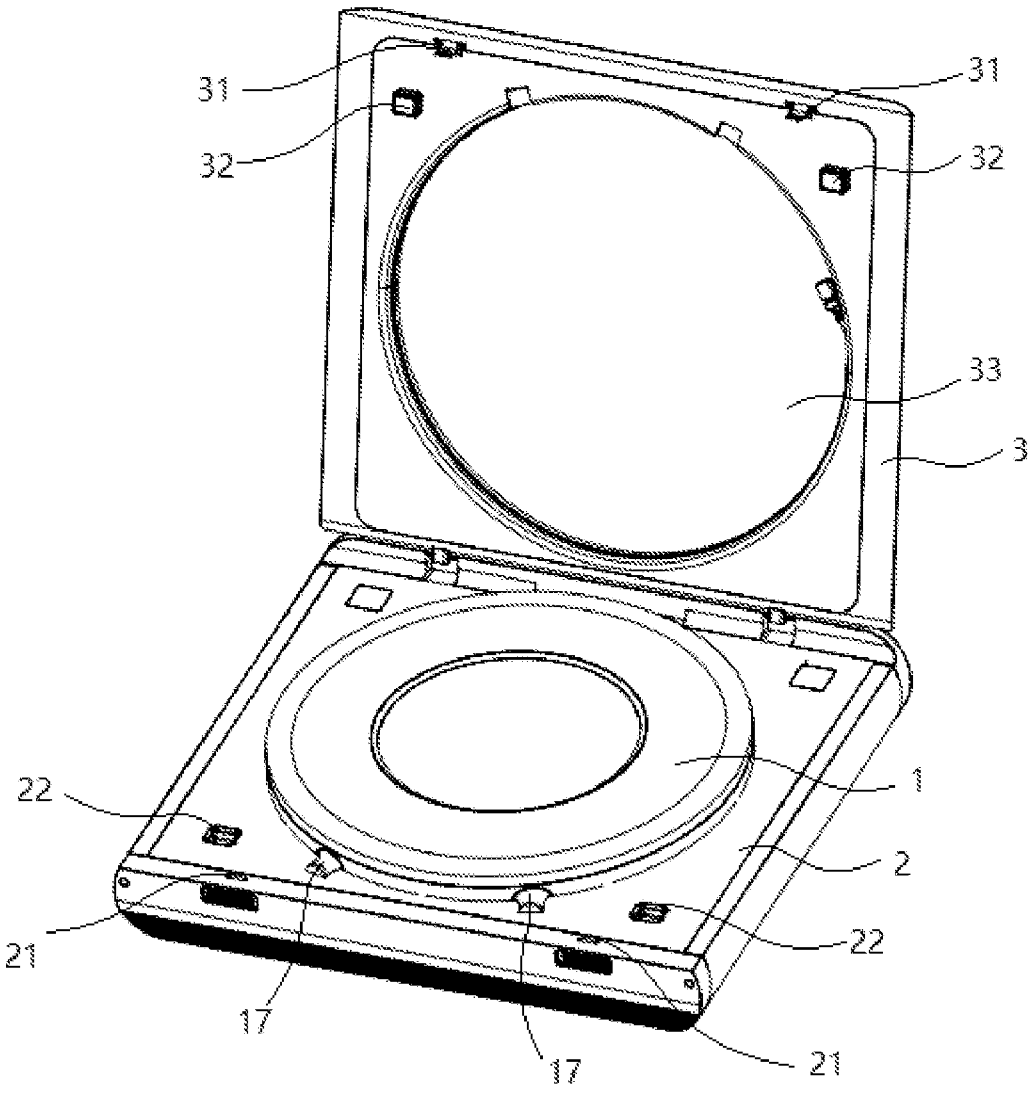
FIG. 4 is an assembly view showing the speaker module and the mounting housing according to embodiments of the present application in a case that the cover plate is opened.

As shown in FIG. 4, the one side edge of the cover plate 3 is rotatably connected to a side edge of the mounting housing 2. For example, a rotation shaft is provided between the one side edge of the cover plate 3 and the side edge of the mounting housing 2, such that the cover plate 3 can be rotated to a position perpendicular to the mounting housing 2, or to a position parallel to and contacting the mounting housing 2, so as to abut against and fix the speaker module 1.

In some embodiments, the another side edge of the cover plate 3 is provided with a first snap-fit portion. As shown in FIG. 4, at an upper side edge of the cover plate 3, the mounting housing 2 is provided with a second snap-fit portion, and the first snap-fit portion and the second snap-fit portion can be connected by snap-fit. In this way, when the mounting housing 2 is closed by the cover plate 3, the cover plate 3 can be secured to the mounting housing 2 by snap-fit between the first snap-fit portion and the second snap-fit portion.

One of the first snap-fit portion and the second snap-fit portion is a hook 31, and the other one of the first snap-fit portion and the second snap-fit portion is a hole 21. The cover plate 3 is locked and secured with respect to the mounting housing 2 by the snap fit between the hook 31 and the hole 21. In specific design, as shown in FIG. 4, the hook 31 is provided on the cover plate 3, and protrudes with respect to a side surface facing the mounting cavity 23. Meanwhile, the hole 21 is provide at the side of the mounting housing 2 having the mounting cavity 23, and is sunken downwards, such that when the mounting housing 2 is closed by the cover plate 3, the hook 31 inserts into the hole 21 to secure the cover plate 3 with the mounting housing 2 by snap fit.

In actual design, multiple hooks 31 and multiple holes 21 are provided, and the multiple hooks 31 and the multiple holes 21 are matched in one-to-one correspondence. In this way, the cover plate 3 and the mounting housing 2 can be secured by snap-fit at multiple positions, thereby improving the stability of the snap-fit between the cover plate 3 and the mounting housing 2, ensuring the speaker module 1 to be stably mounted in the mounting cavity 23, and preventing the speaker module 1 from falling out due to unstable closing of the cover plate 3.

In some embodiments, the another side edge of the cover plate 3 is provided with a first positioning portion, and the mounting housing 2 is provided with a second positioning portion, and the first positioning portion and the second positioning portion are connected by insertion for positioning. In this way, when the mounting housing 2 is closed by the cover plate 3, the cover plate 3 and the mounting housing 2 are secured by insertion between the first positioning portion and the second positioning portion, such that relative positions of the cover plate 3 and the mounting housing 2 are fixed.

One of the first positioning portion and the second positioning portion is a positioning rod 32, and the other one of the first positioning portion and the second positioning portion is a positioning hole 22. The cover plate 3 is positioned and fitted with respect to the mounting housing 2 by insertion between the positioning rod 32 and the positioning hole 22. In specific design, as shown in FIG. 4, the positioning rod 32 is provided on the cover plate 3, and protrudes with respect to the side surface facing the mounting cavity 23. Meanwhile, the positioning hole 22 is provide at the side of the mounting housing 2 having the mounting cavity 23, and is sunken downwards, such that when the mounting housing 2 is closed by the cover plate 3, the positioning rod 32 inserts into the positioning hole 22 to fix the cover plate 3 and the mounting housing 2 by snap-fit.

In actual design, multiple positioning rods 32 and multiple positioning holes 22 are provided, and the multiple positioning rods 32 and the multiple positioning holes 22 are fitted in one-to-one correspondence. In this way, the cover plate 3 and the mounting housing 2 is secured by snap-fit at multiple positions, thereby improving the stability of the snap fit between the cover plate 3 and the mounting housing 2, ensuring the speaker module 1 to be stably mounted in the mounting cavity 23, and preventing the speaker module 1 from falling out due to unstable closing of the cover plate 3.

Specifically, as shown in FIG. 4, two hooks 31 and two positioning rods 32 are provided at the side of the cover plate 3 facing the mounting cavity 23, such that when the mounting housing 2 is closed by the cover plate 3, the two hooks 31 cooperate with two holes 21 respectively by snap-fit, and the two positioning rods 32 insert into two positioning holes 22, thereby achieving two sets of snap-fit as well as two sets of positioning. After positioning by the positioning rods 32 and the positioning holes 22, the hooks 31 exactly face the corresponding holes 21 respectively, such that the hooks 31 can enter the holes 21 smoothly, which improves closing efficiency of the cover plate 3.

In some embodiments, the speaker module 1 is provided with a speaker hole, the cover plate 3 is provided with an avoidance hole 33, and the speaker hole is exposed at the position of the avoidance hole 33 when the mounting cavity 23 is closed by the cover plate 3, such that after the speaker module 1 is secured in the mounting cavity 23, the speaker hole of the speaker module 1 can still be exposed at the position of the avoidance hole 33, so as to ensure the sound quality of the speaker module 1 not to be affected.

The speaker hole is a small round hole, which is open at a surface of the speaker module 1. The avoidance hole 33 is defined at the cover plate 3 and passes through the cover plate 3 in a thickness direction of the cover plate 3, and the avoidance hole 33 is a large round hole. In this way, after the mounting housing 2 is closed by the cover plate 3, the small round hole is exposed at the position of the large round hole to play the sound, and an edge of the avoidance hole 33 abuts against the surface of the speaker module 1 to tightly press and secure the speaker module 1. Certainly, in actual design, the speaker hole and the avoidance hole 33 may be of other shapes.

In some embodiments, the speaker module 1 is disc-shaped, the avoidance hole 33 is a round hole, and the mounting cavity 23 is a cylinder-shaped cavity. An inner diameter of the mounting cavity 23 is larger than an outer diameter of the speaker module 1, the outer diameter of the speaker module 1 is larger than an inner diameter of the avoidance hole 33, and an axis of the speaker module 1 coincides with an axis of the avoidance hole 33, such that the speaker module 1 is mounted in the mounting cavity 23, the cover plate 3 covers the speaker module 1, and the avoidance hole 33 and the speaker hole are defined coaxially along an axial direction of the speaker module 1, which ensures the speaker module 1 to be centered in the mounting cavity 23.

In some embodiments, the speaker module 1 is positioned and fitted with the mounting housing 2 in the mounting cavity 23, and the speaker module 1 is detachably connected to the mounting housing 2 through a connector 4. That is, when the speaker module 1 is connected and secured to the mounting housing 2, the speaker module 1 is positioned and fitted with the mounting housing 2, and the speaker module 1 and the mounting housing 2 are secured by the connector 4, such that the speaker module 1 and the mounting housing 2 are relatively stable.

In this way, with the manner of positioning plus securing, mounting efficiency can be improved. The connection structure may be a snap fit structure, a threaded connection structure or other structures. That is to say, in this embodiment, the speaker module 1 is positioned with respect to the mounting housing 2 by its own structure, and the speaker module 1 and the mounting housing 2 are secured and fitted through the connection structure, which simplifies the mounting structure. Other components such as the cover plate 3 or the like is not needed for securing, which reduces mounting cost. The speaker module 1 and the mounting housing 2 are positioned and fitted by a positioning protrusion 16 and a positioning insertion groove, to pre-position the speaker module 1 and the mounting housing 2, so as to facilitate quick securing of the connection structure. Specifically, the positioning protrusion 16 is arranged at a bottom wall or a lateral wall of the speaker module 1, and the positioning insertion groove is defined at an inner bottom wall or an inner lateral wall of the mounting housing 2, such that after the speaker module 1 is mounted in the mounting cavity 23, the positioning protrusion 16 and the positioning insertion groove are connected by insertion for positioning.

In some embodiments, the speaker module 1 is provided with a first connecting portion 15, the mounting housing 2 is provided with a mounting hole 25, and the connector 4 passes through the mounting hole 25 and extends into the mounting cavity 23 to be connected to the first connecting portion 15. That is to say, the mounting hole 25 is defined at the mounting housing 2, and passes from outside of the mounting housing 2 to inside of the mounting cavity 23, such that the connector 4 can extend into the mounting cavity 23 after passing through the mounting hole 25. Meanwhile, the first connecting portion 15 is a threaded hole, such that the connector 4 extends into the threaded hole to be in threaded fit with the speaker module 1, thereby realizing relative securing between the speaker module 1 and the mounting housing 2.

In this way, the connector 4 passes through the mounting housing 2 and is in a threaded connection with the speaker module 1, thus the speaker module 1 is secured to the mounting housing 2, which reduces the number of the connection structure, and reduces arrangement cost. Moreover, the first connecting portion 15 may be arranged at a side of the speaker module 1 located in the mounting cavity 23, and the connector 4 may extend to the side of the speaker module 1 away from the speaker hole for connection. In this way, when the user uses the speaker system 100, a side of the speaker module 1 having the speaker hole faces the user, and the connector 4 and the first connecting portion 15 are not exposed at the side facing the user, which improves visual experience of the user.

Figure 5:
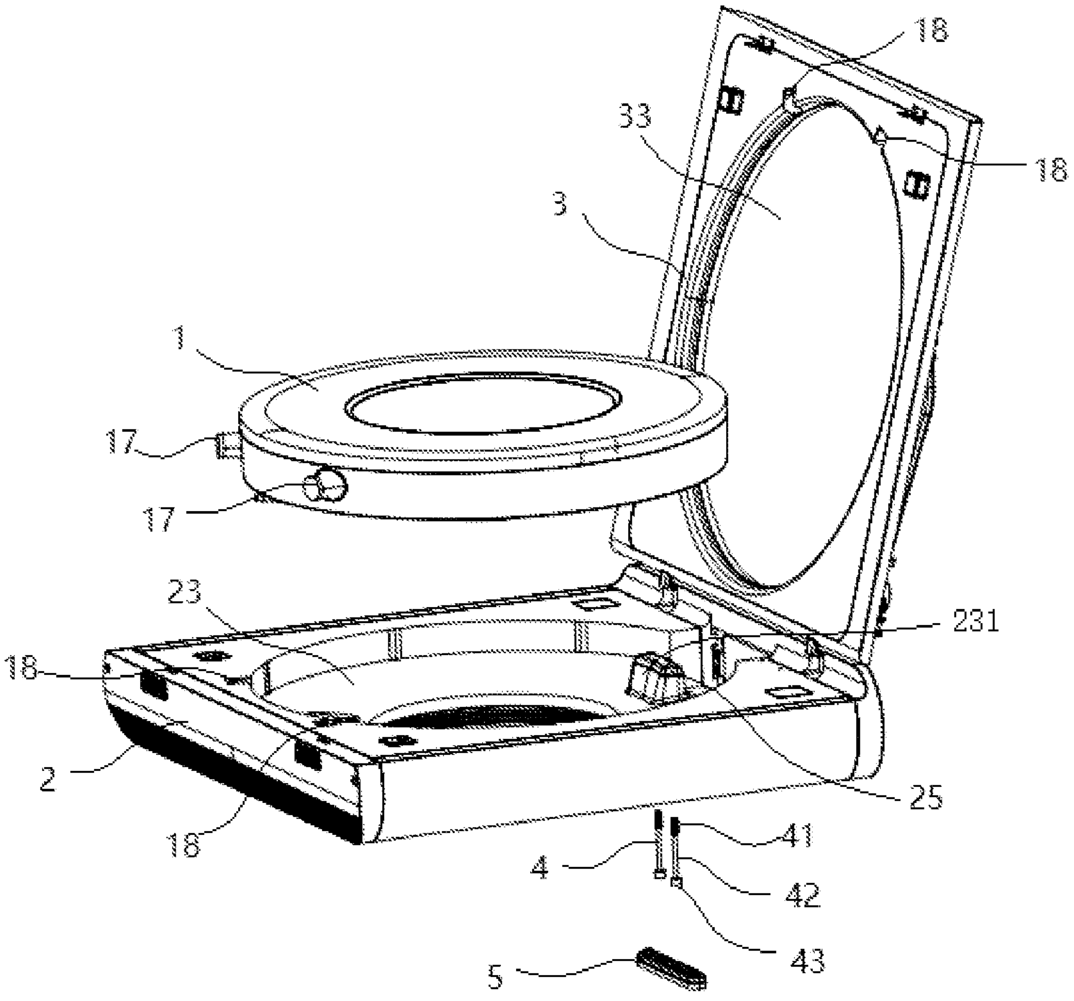
FIG. 5 is an exploded assembly view showing the speaker module and the mounting housing according to embodiments of the present application.

As shown in FIG. 5, a bottom wall of the mounting cavity 23 is provided with a reinforcing boss 231. The mounting hole 25 is defined at the reinforcing boss 231, and passes through the mounting housing 2 along the reinforcing boss 231 to increase a length of the threaded fit between the connector 4 and the mounting housing 2.

In some embodiments, as shown in FIG. 5, the connector 4 includes a threaded segment 41, a smooth segment 42 and a head portion 43 being connected in sequence. An outer diameter of the head portion 43 is larger than an outer diameter of the smooth segment 42, and the outer diameter of the smooth segment 42 is equal to an outer diameter of the threaded segment 41. The smooth segment 42 passes through the mounting hole 25, the threaded segment 41 is in threaded fit with the first connecting portion 15, and the head portion 43 abuts against a side edge of the mounting hole 25 away from the mounting cavity 23.

In this way, during actual mounting, first, the connector 4 is arranged at a side of the mounting housing 2 away from the speaker module 1, then the threaded segment 41 and the smooth segment 42 pass through the mounting hole 25 in sequence, such that the threaded segment 41 extends into the mounting cavity 23 and gradually extends into the threaded hole. When the head portion 43 abuts against the mounting housing 2, the connector 4 secures the speaker module 1 with respect to the mounting housing 2.

The speaker module 1 is fixed by the connector 4, which simplifies the structure and facilitates mounting. During dismounting, the connector 4 can be detached from the mounting housing 2 by rotation and separation made to the threaded connection between the connector 4 and the speaker module 1, hence the dismounting process is easy.

Furthermore, a cover cap 5 may be provided on the mounting housing 2. After the connector 4 is mounted to the mounting housing 2, the cover cap 5 covers the mounting hole 25 to shelter the connector 4, such that the connector 4 is not exposed, and the outer structure of the mounting housing 2 is neater.

In some embodiments, multiple connectors 4 are provided, i.e. multiple threaded holes and multiple mounting holes 25 are provided, and the multiple threaded holes, the multiple mounting holes 25 and the multiple connectors 4 cooperate with each other in one-to-one correspondence, such that the speaker module 1 and the mounting housing 2 are secured and connected at multiple positions. As shown in FIG. 5, two connectors 4 are provided, and are spaced apart in parallel. The two connectors 4 passes through a bottom portion of the mounting housing 2, and the bottom portion of the speaker module 1 is provided with two threaded holes in threaded connections with the two connectors 4 respectively.

Figure 6:
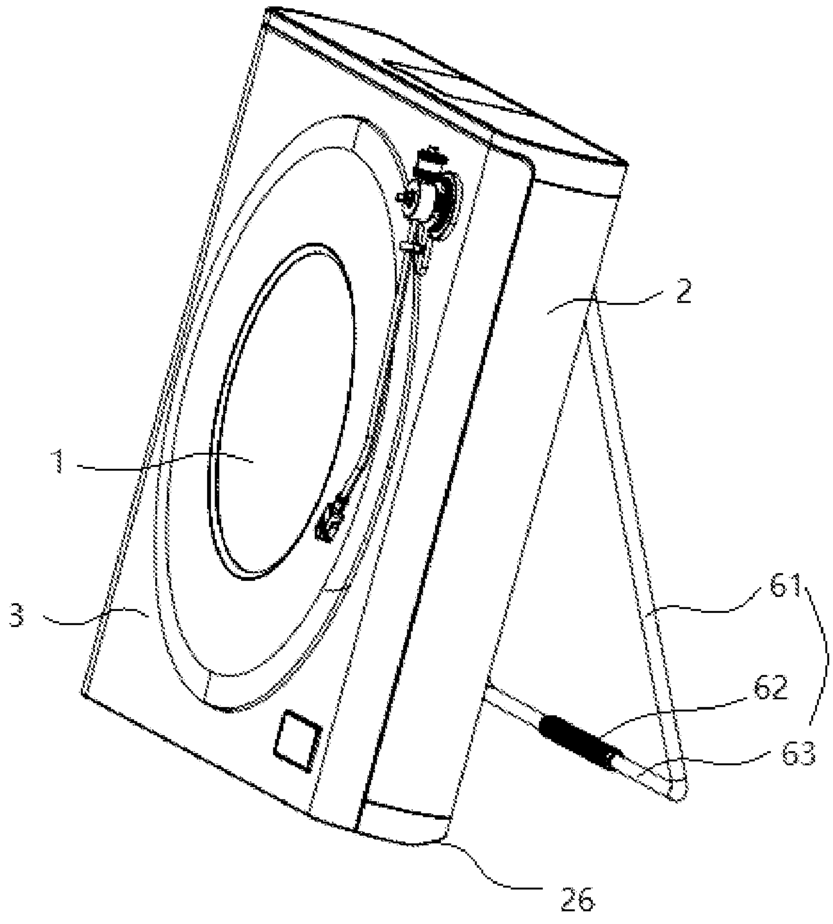
FIG. 6 is an assembly view showing the speaker module and the mounting housing according to embodiments of the present application in a case that a support member is opened.
Figure 7:
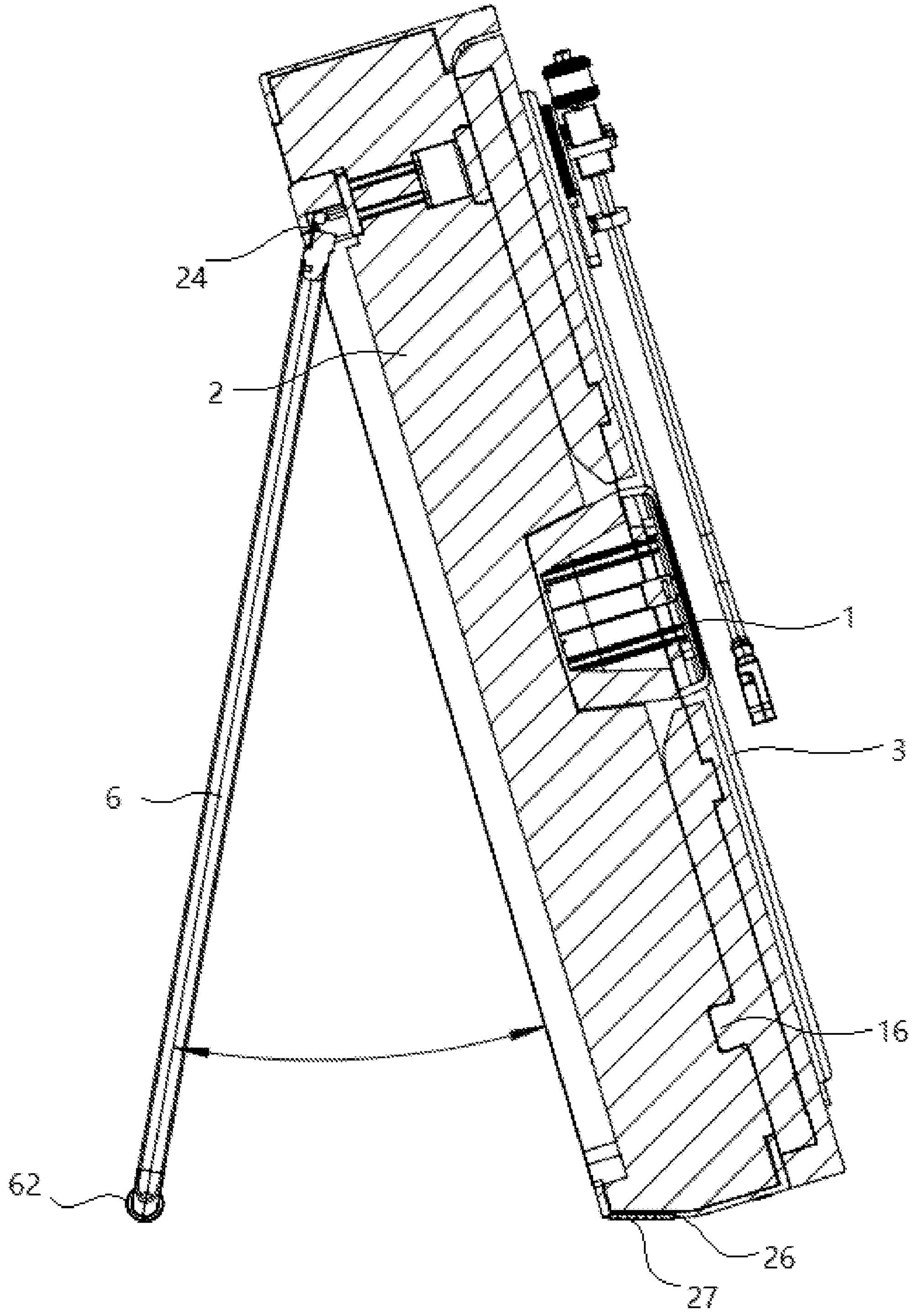
FIG. 7 is a sectional view showing the speaker module and the mounting housing according to embodiments of the present application being assembled in the case that the support member is opened.

In some embodiments, as shown in FIG. 6 and FIG. 7, the side of the mounting housing 2 away from the speaker module 1 is provided with a support member 6, and in a case that the speaker module 1 is in the first mounting state, the support member 6 is supported on the placement surface. The support member 6 is rotatably connected to the mounting housing 2, and has an unfolded state and a folded state with respect to the mounting housing 2. That is to say, the support member 6 and the mounting housing 2 can relatively move. And in this embodiment, the support member 6 and the mounting housing 2 can relatively rotate, such that the support member 6 has an unfolded state and a folded state with respect to the mounting housing 2. In a case that the support member 6 moves with respect to the mounting housing 2 to be in the unfolded state, there is an angle between the support member 6 and the mounting housing 2, such that the mounting housing 2 is supported and the speaker system 100 is in an inclined state. In a case that the support member 6 moves with respect to the mounting housing 2 to be in the folded state, the support member 6 is accommodated and is parallel to the mounting housing 2, such that the speaker system 100 is accommodated, which facilitates using of the speaker system 100.

In the case that the support member 6 is in the unfolded state, the mounting housing 2 is supported on the placement surface through the support member 6. That is, when the speaker system 100 is operated, the support member 6 moves with respect to the mounting housing 2 to be in the unfolded state, and the speaker system 100 is supported on the placement surface through a bottom portion of the support member 6 and a bottom portion of the mounting housing 2 at the same time, thus a triangular support structure is formed to improve placement stability of the speaker system 100. Furthermore, when the speaker system 100 plays audio and video, positions of the mounting housing 2 and the support member 6 are relatively stable. The placement surface may be a desk top, a table top or a bedside table.

In some embodiments, as shown in FIG. 6 and FIG. 7, the mounting housing 2 is provided with a support plane 26, and the support plane 26 together with the support member 6 is supported on the placement surface. In this way, the bottom portion of the mounting housing 2 is in surface contact with the placement surface, which can improve stability of the speaker system 100 being placed in an inclined manner.

Specifically, the mounting housing 2 has a square shape, and an angle is formed between the support plane 26 and a bottom face of the mounting housing 2. That is, the support plane 26 is arranged at a side edge of the bottom face of the mounting housing 2 close to the support member 6, such that a certain angle is formed between the support plane 26 and the bottom face of the mounting housing 2, and the angle matches the angle by which the support member 6 is unfolded, so as to facilitate arrangements of the support plane 26 and the support member 6. Furthermore, when the speaker system 100 is inclined, the mounting housing 2 contacts the placement surface at the support plane 26 to be supported, such that stability of the inclined speaker system 100 is improved, the structure is simple, and the processing cost is low.

In some embodiments, when the support member 6 and the support plane 26 are supported on the placement surface together, both angles are formed between the support member 6 and a vertical direction and between the mounting housing 2 and the vertical direction respectively. That is, after the support member 6 is unfolded with respect to the mounting housing 2, there is an angle between the support member 6 and the placement surface, and the angle is not a right angle, such that the support member 6 can support the mounting housing 2 more stably.

Moreover, the angle between the support member 6 and the placement surface is equal to the angle between the mounting housing 2 and the placement surface. That is to say, the angle between the support member 6 and the placement surface may be or may not be equal to the angle between the mounting housing 2 and the support plane 26. In a case that the two angles are equal, viewing from a side of the opened support member 6 and the mounting housing 2, the support member 6 and the mounting housing 2 form a symmetrical triangle with respect to the vertical direction. Conversely, in a case that the two angles are not equal, the support member 6 and the mounting housing 2 form an asymmetrical triangle. With either of the two arrangements, stability of the inclined speaker system 100 can be improved.

An angle between the mounting housing 2 and the support member 6 ranges from 25° to 30°. That is, the angle between the mounting housing 2 and the support member 6 is referred to as α, where a has a value of 25°, 27°, 30° or the like. In a case that the range of the angle between the mounting housing 2 and the opened support member 6 satisfies $25° \leq \alpha \leq 30°$, the support member 6 and the mounting housing 2 form an acute triangle, and the angle is relatively small, such that the bottom portions of the support member 6 and the mounting housing 2 contact the placement surface more tightly. Moreover, with the relatively small angle, a space being occupied when the speaker system 100 is supported is small, and the overall size is appropriate, which improves experience of the user using the speaker system 100.

In some embodiments, the support member 6 includes a bottom rod 61 and two lateral rods 63. The two lateral rods 63 are spaced apart, and top portions of the two lateral rods 63 are rotatably connected to the mounting housing 2. Bottom portions of the two lateral rods 63 are spaced apart, and are connected to the bottom rod 61, and the bottom rod 61 is supported on the placement surface.

Specifically, the support member 6 includes three connecting rods, namely a bottom rod 61 and two lateral rods 63. As shown in FIG. 1, the bottom rod 61 is located at the bottom portion of the support member 6, and the two lateral rods 63 are spaced apart. Bottom portions of the two lateral rods 63 are spaced apart, and are connected to the bottom rod 61. The bottom rod 61 and the two lateral rods 63 may all be round rods, and are connected by bending. In this way, the structure of the support member 6 is simple, the processing cost is low. The three rods may be connected by welding or other means.

Moreover, top portions of the two lateral rods 63 are rotatably connected to the mounting housing 2, and the bottom rod 61 is supported on the placement surface. When the speaker system 100 is being used, the two lateral rods 63 are rotated outwards with respect to the mounting housing 2 to be unfolded, and the bottom rod 61 is supported on the placement surface, thereby realizing the speaker system 100 to place in an inclined manner. When the speaker system 100 is not used, the two lateral rods 63 are rotated inwards with respect to the mounting housing 2 to be folded, thereby accommodating the support member 6, hence the operation is simple and easy.

In some embodiments, as shown in FIG. 6, a first anti-slip mat 62 is sleeved outside the bottom rod 61, such that a friction force is generated between the support member 6 and the placement surface, which improves the placement stability of the support member 6. In actual design, the first anti-slip mat 62 has an annular shape, and is sleeved outside the bottom rod 61. An axial length of the first anti-slip mat 62 may be equal to a length of the bottom rod 61, or may be around one third of the length of the bottom rod 61. As shown in FIG. 1, the first anti-slip mat 62 is arranged at a center position of the bottom rod 61, such that two ends of the bottom rod 61 are at a same height. An inner diameter of the first anti-slip mat 62 matches an outer diameter of the bottom rod 61, so as to prevent the first anti-slip mat 62 from sliding with respect to the bottom rod 61. With the first anti-slip mat 62, the bottom portion of the support member 6 is prevented from sliding.

The first anti-slip mat 62 may be made of a rubber material, and an anti-slip protrusion rib may be provided on the rubber material along a circumferential direction. When the speaker system 100 is placed in an inclined manner, the bottom portion of the support member 6 can be stably placed on the placement surface under the friction of the first anti-slip mat 62, such that the bottom portion of the support member 6 stably contacts the placement surface. In cooperation with the friction force of the first anti-slip mat 62 at the bottom portion of the support member 6, the speaker system 100 is effectively prevented from sliding when playing audio and video, which increases stability of the speaker system 100 being inclined, and the structure is simple, the cost is low.

In some embodiments, as shown in FIG. 7, a second anti-slip mat 27 is attached on the support plane 26, hence there is a friction force between the support plane 26 and the placement surface, which increases stability of the mounting housing 2. In actual design, the second anti-slip mat 27 and the support plane are connected by an adhesive. As shown in FIG. 5, the second anti-slip mat 27 may be laid over the whole support plane 26 or only part of the support plane 26. Furthermore, the second anti-slip mat 27 has a small thickness, thus the cost is low, and the second anti-slip mat 27 has an anti-slip effect.

The second anti-slip mat 27 may be made of a rubber material, and an anti-slip protrusion rib may be provided on the rubber material. When the speaker system 100 is placed in an inclined manner, the support plane 26 can be stably placed on the placement surface under the friction of the second anti-slip mat 27, such that the bottom portion of the mounting housing 2 stably contacts the placement surface, and the speaker system 100 is prevented from sliding due to vibrations when playing audio and video. Moreover, with the second anti-slip mat 27 at the support plane 26, the friction between the support plane 26 and the contact surface is increased, which reduces a force at a position where the support member 6 and the mounting housing 2 are rotatably connected, and improves the service life of the support member 6.

In some embodiments, the mounting housing 2 is provided with a limiting portion 24, and when the support member 6 is rotated with respect to the mounting housing 2 to a maximum angle, the support member 6 abuts against the limiting portion 24 and is limited by the limiting portion 24. That is, the support member 6 is limited at the limiting portion 24 when being rotated to the maximum angle, therefore a rotation angle of the support member 6 with respect to the mounting housing 2 is fixed, such that the rotation angle is accurate and stable.

Specifically, the limiting portion 24 is arranged at a position where each lateral rod 63 is connected to the mounting housing 2, i.e. the limiting portion 24 is arranged at an outermost side at an upper end of the mounting housing 2. As shown in FIG. 7, the limiting portion 24 is a limiting plate extending along a width direction of the mounting housing 2. When the lateral rod 63 is rotated outwards with respect to the mounting housing 2 to the maximum angle, the lateral rod 63 abuts against an inner side of the limiting plate and is limited by the limiting plate, i.e. the support member 6 is rotated with respect to the mounting housing 2 in position, and the support member 6 abuts against and is limited by the limiting plate in the width direction of the mounting housing 2, such that the limitation between the limiting portion 24 and the support member 6 is more reliable. In this way, the limiting portion 24 is provided at the mounting housing 2, hence an upper end of the support member 6 is limited, which can ensure the angle between the support member 6 and the mounting housing 2 to be a preset value, such that the angle is accurate every time the speaker system 100 is used, so as to ensure a better audio performance when playing audio and video.

In some embodiments, the speaker module 1 is provided with multiple connecting positions. The mounting rod set 7 includes multiple support rods 71, and top portions of the multiple support rods 71 are connected to the multiple connecting positions in one-to-one correspondence. In this way, the speaker module 1 can be supported by the multiple support rods 71 in the second mounting state.

Figure 2:
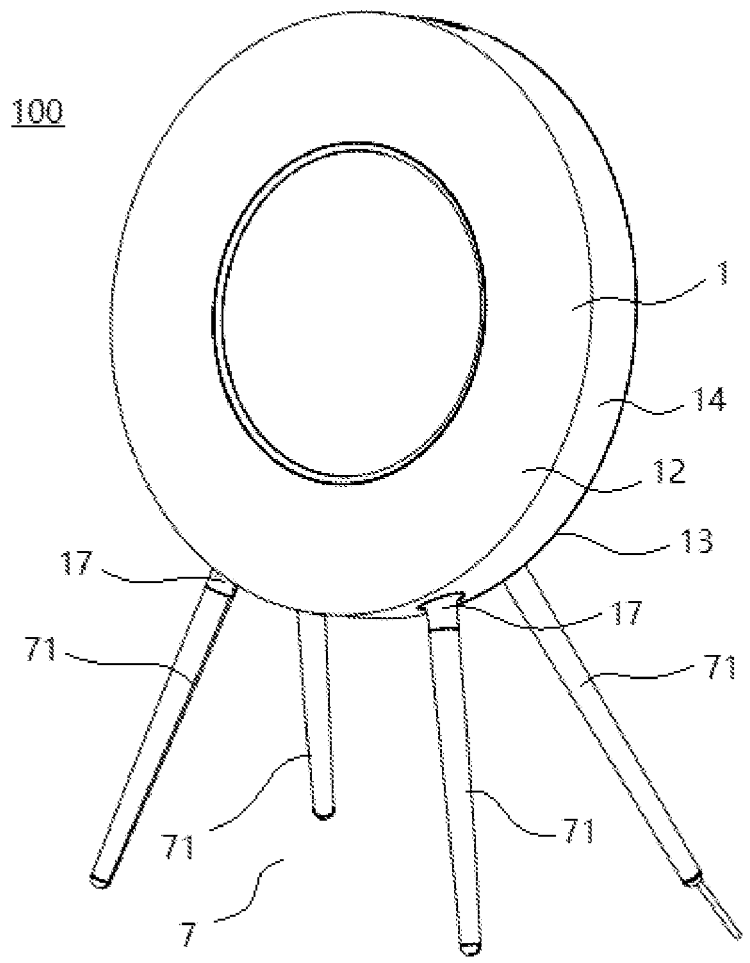
FIG. 2 is an assembly view showing the speaker module being mounted to a mounting rod set according to embodiments of the present application.

In actual design, more than three support rods 71 are provided, such that the speaker module 1 is in a relatively stable state when being supported by the more than three support rods 71. As shown in FIG. 2, four support rods 71 are provided, and the four support rods 71 are spaced apart and supported at the bottom portion of the speaker module 1. It should be noted that, three of the four support rods 71 have fixed lengths, while the other one of the four support rods 71 has an adjustable length. In this way, when the three of the four support rods 71 is stably supported, the length of the other one of the four support rods 71 can be adjusted, such that bottom portions of the four support rods 71 are in a same plane to be stably supported on the placement surface.

In actual design, the multiple support rods 71 have different lengths. The user can replace the multiple support rods 71 at different positions according to actual needs to flexibly adjust the height of the speaker module 1.

In some embodiments, the connecting positions are connection holes 11. A top portion of each support rod 71 is provided with a threaded connecting segment, and the threaded connecting segment extends into the corresponding connection hole 11 to be in a threaded connection with the speaker module 1. That is to say, the connection hole 11 has an internal thread. During actual mounting, the top portion of the support rod 71 extends into the connection hole 11 to be in a threaded connection with the speaker module 1, to be connected and fixed to the speaker module 1.

In this way, the connection holes 11 are provided in connections and fit with the support rods 71, therefore the structure is simple, and little changes are made to the structure of the speaker module 1, which reduces the arrangement cost. Moreover, a threaded connection is enough for connecting the speaker module 1 and each support rod 7, which significantly simplified the mounting steps and improves the mounting efficiency.

Figure 3:
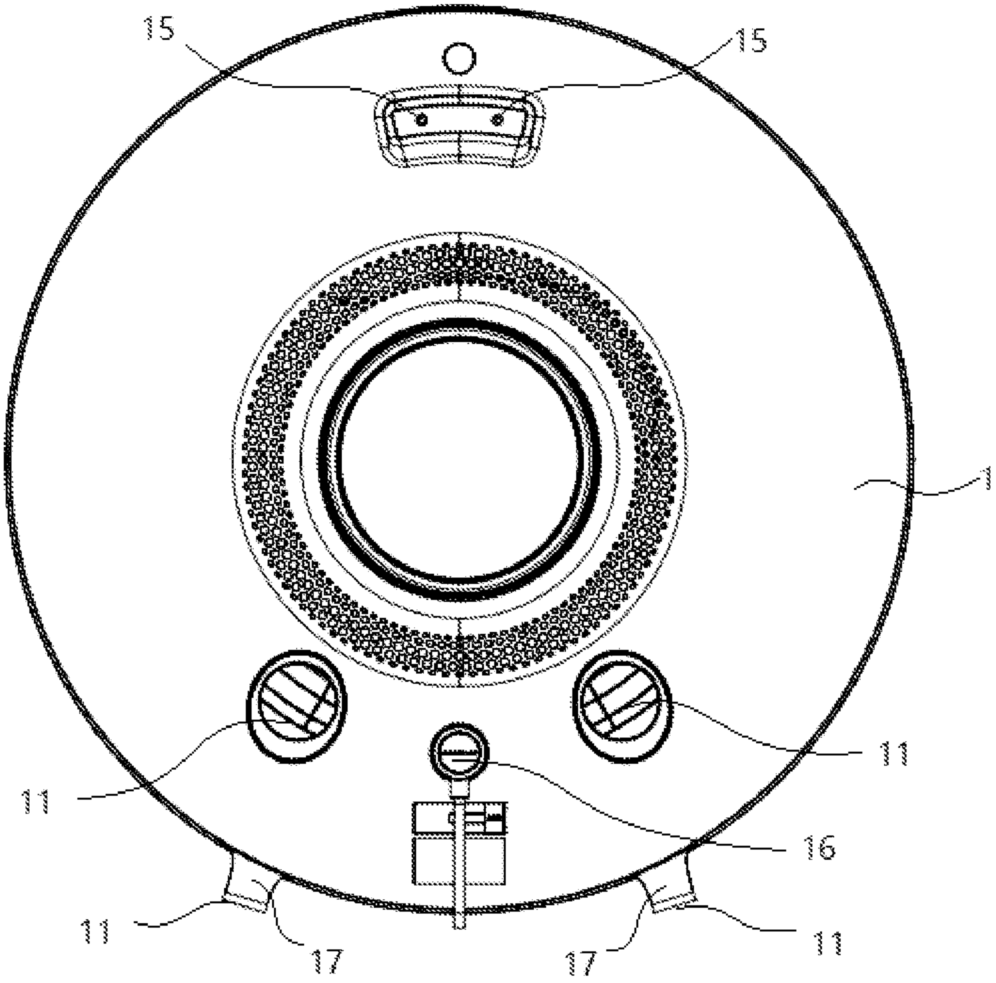
FIG. 3 is a schematic view showing the structure of the speaker module according to embodiments of the present application.

In some embodiments, as shown in FIG. 3 and FIG. 5, the speaker module 1 is disc-shaped, and the speaker module 1 includes a first side surface 12, a second side surface 13 and an annular surface 14. The first side surface 12 and the second side surface 13 are distributed opposite to each other, and the annular surface 14 is arranged around the first side surface 12 and the second side surface 13. The first side surface 12 is provided with a speaker hole, and the second side surface 13 and/or the annular surface 14 are provided with the connecting positions. In other words, at least one of the second side surface 13 and the annular surface 14 is provided with the connecting positions to be in connections and fit with the support rods 71, thus the arrangement manners are flexible and selectable.

As shown in FIG. 2 and FIG. 3, the first side surface 12 is a front side surface of the speaker module 1, and a speaker hole is provide at the front side surface of the speaker module 1. The second side surface 13 is a back side surface of the speaker module 1, and two connection holes 11 are provided at a bottom portion of the annular surface 14. Specifically, as shown in FIG. 3, two connecting rods 17 are provided at the bottom portion of the annular surface 14, and the two connecting rods 17 are provided with the two connection holes 11 respectively, such that two of the support rods 71 are in threaded connections with the two connecting rods 17 respectively. Moreover, another two connection holes 11 are provided at a bottom region of the back side surface, and the number of the support rods 71 is four. Top portions of two of the support rods 71 are in threaded connections with the two connection holes 11 on the annular surface 14 respectively, and top portions of the other two of the support rods 71 are in threaded connections with the other two connection holes 11 on the back side surface respectively. In this way, the speaker module 1 is mounted and supported, the structure is simple, and mounting is easy.

It should be noted that, the speaker module 1 is provided with the connecting rods 17 in threaded connections with the support rods 71. When the support rods 71 are not needed for supporting and the speaker module 1 is mounted in the mounting housing 2, the mounting housing 2 is provided with avoidance grooves 18 for avoiding the connecting rods 17. Similarly, the cover plate 3 may be provided with avoidance grooves 18 to avoid the connecting rods 17, such that the speaker module 1 is available in both mounting states, which enriches application scenarios.

In the description of this specification, descriptions referring to the terms “one embodiment”, “some embodiments”, “exemplary embodiment”, “example”, “specific example”, “some examples”, etc., mean that specific features, structures, materials or characteristics described in conjunction with the embodiment or example are included in at least one embodiment of the present application. In this specification, schematic expressions of the above terms do not necessarily refer to the same embodiment or example. Furthermore, the specific features, structures, materials or characteristics described may be combined in any suitable manner in any one or more embodiments or examples.

Although the embodiments of the present application are illustrated and described, it should be understood by those skilled in the art that, multiple variations, modifications or replacements may be made to these embodiments without departing from the principle and spirit of the present application. The scope of the present application is defined by the claims and equivalents thereof.

The invention claimed is:

1. A speaker system, comprising:

a speaker module, a mounting housing, and a mounting rod set, wherein the speaker module has a first mounting state and a second mounting state, and the mounting housing is provided with a mounting cavity; and the speaker module is mounted in the mounting cavity in the first mounting state, and the speaker module is mounted and supported at a top portion of the mounting rod set in the second mounting state.

2. The speaker system according to claim 1, wherein the mounting housing and the mounting rod set are both independent with respect to and detachable from the speaker module.

3. The speaker system according to claim 1, wherein the mounting cavity is open at a side of the mounting housing, and the side of the mounting housing is connected with a cover plate, wherein the cover plate is configured for opening or closing the mounting cavity, and in a case that the mounting cavity is closed by the cover plate, the speaker module is secured in the mounting cavity by the cover plate.

4. The speaker system according to claim 3, wherein one side edge of the cover plate is rotatably connected to the mounting housing, and another side edge of the cover plate is lockable with respect to the mounting housing.

5. The speaker system according to claim 4, wherein the another side edge of the cover plate is provided with a first snap-fit portion, and the mounting housing is provided with a second snap-fit portion, wherein the first snap-fit portion and the second snap-fit portion are connected by snap-fit.

6. The speaker system according to claim 4, wherein the another side edge of the cover plate is provided with a first positioning portion, and the mounting housing is provided with a second positioning portion, wherein the first positioning portion and the second positioning portion are connected by insertion for positioning.

7. The speaker system according to claim 3, wherein the speaker module is provided with a speaker hole, the cover plate is provided with an avoidance hole, and the speaker hole is exposed at a position of the avoidance hole in the case that the mounting cavity is closed by the cover plate.

8. The speaker system according to claim 7, wherein the speaker module is disc-shaped, an outer diameter of the speaker module is larger than an inner diameter of the avoidance hole, and an axis of the speaker module coincides with an axis of the avoidance hole.

9. The speaker system according to claim 1, wherein the speaker module is positioned and fitted with the mounting housing in the mounting cavity, and the speaker module is detachably connected to the mounting housing through a connector.

10. The speaker system according to claim 9, wherein the speaker module is provided with a first connecting portion, the mounting housing is provided with a mounting hole, and the connector passes through the mounting hole and extends into the mounting cavity to be connected to the first connecting portion.

11. The speaker system according to claim 10, wherein the connector comprises a threaded segment, a smooth segment and a head portion being connected in sequence, wherein the smooth segment passes through the mounting hole, the threaded segment is in threaded fit with the first connecting portion, and the head portion abuts against a side edge of the mounting hole away from the mounting cavity.

12. The speaker system according to claim 1, wherein a side of the mounting housing away from the speaker module is provided with a support member, and in a case that the speaker module is in the first mounting state, the support member is supported on a placement surface.

13. The speaker system according to claim 12, wherein the mounting housing is provided with a support plane, the support plane together with the support member is supported on the placement surface, and an angle between the mounting housing and the support member ranges from 25° to 30°.

14. The speaker system according to claim 13, wherein a bottom portion of the support member is provided with a first anti-slip mat, and/or, the support plane is provided with a second anti-slip mat.

15. The speaker system according to claim 12, wherein the mounting housing is provided with a limiting portion, and in a case that the support member is rotated with respect to the mounting housing to a maximum angle, the support member abuts against the limiting portion and is limited by the limiting portion.

16. The speaker system according to claim 1, wherein the speaker module is provided with a plurality of connecting positions, the mounting rod set comprises a plurality of support rods, and top portions of the plurality of support rods are connected to the plurality of connecting positions in one-to-one correspondence.

17. The speaker system according to claim 16, wherein the plurality of connecting positions are a plurality of connection holes, a top portion of each support rod is provided with a threaded connecting segment, and the threaded connecting segment extends into a corresponding connection hole to be in a threaded connection with the speaker module.

18. The speaker system according to claim 16, wherein the speaker module is disc-shaped, and the speaker module comprises a first side surface, a second side surface and an annular surface, wherein the first side surface and the second side surface are opposite to each other, the annular surface is arranged around the first side surface and the second side surface, the first side surface is provided with a speaker hole, and the second side surface and/or the annular surface are provided with the plurality of connecting positions.

* * * * *